No. 873,343. PATENTED DEC. 10, 1907.
W. L. BEMIS.
EYEGLASSES.
APPLICATION FILED JAN. 11, 1907.
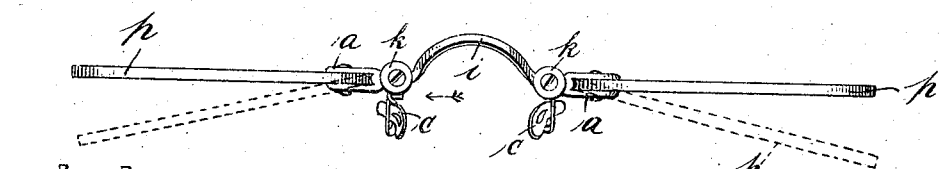
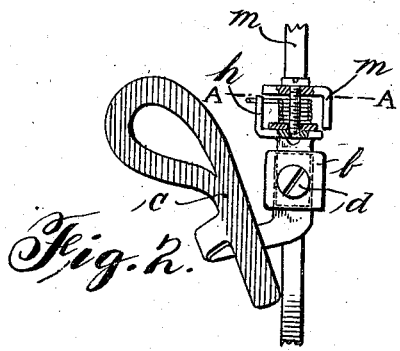
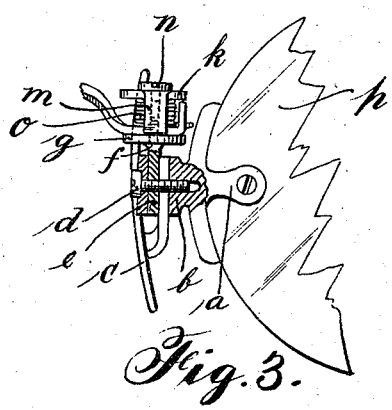
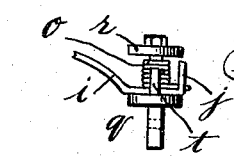
Witnesses: Lillian Hanson. M. Hamilton.
Wallace L. Bemis Inventor
By his Attorney James Hamilton

UNITED STATES PATENT OFFICE.

WALLACE L. BEMIS, OF BROCKTON, MASSACHUSETTS, ASSIGNOR, BY DIRECT AND MESNE ASSIGNMENTS, OF ONE-HALF TO E. KIRSTEIN SONS CO., OF ROCHESTER, NEW YORK, A CORPORATION OF NEW YORK, AND ONE-HALF TO LEO F. ADT, OF ALBANY, NEW YORK.

EYEGLASSES.

No. 873,343.  Specification of Letters Patent.  Patented Dec. 10, 1907.

Application filed January 11, 1907. Serial No. 351,828.

*To all whom it may concern:*

Be it known that I, WALLACE L. BEMIS, a citizen of the United States, residing at Brockton, in the county of Plymouth and State of Massachusetts, have invented certain new and useful Improvements in Eyeglasses, of which the following is a specification, reference being had to the accompanying drawings.

My invention relates to improvements in eyeglasses and particularly to eyeglass centers; and one object of my invention is to provide eyeglasses in which a rigid bridge may be used and the lenses pivotally mounted with respect thereto.

Another object of my invention is to provide a mounting which may be used with the ordinary stud or box now in common use, so that ordinary eyeglasses may be equipped with my improvement at small expense.

In the drawings illustrating the principle of my invention and the best mode now known to me of applying that principle, Figure 1 is a plan view of a pair of eyeglasses embodying my invention, Fig. 2 is a detail showing the pivotal mounting viewed in the direction of the arrow in Fig. 1; Fig. 3 is a detail showing the pivotal connection as viewed from the front, the stud being shown in sectional view, Fig. 4 is a sectional detail on the line A—A of Fig. 2, Fig. 5 is a detail showing the rigid bridge, and Figs 6, 7, 8 and 9 are details showing the modifications.

The strap $a$, the stud or box $b$, the nose-guard $c$ and the securing screw $d$ are all of the usual construction now found in eyeglasses. Clamped in the stud or box $b$ by the screw $d$ is the flat shank $e$ of the pivot-piece $f$ from the base $g$ of which extends upwardly a lug $h$. Mounted upon the base $g$ of the pivot-piece $f$ is one end of the rigid bridge $i$ formed with the lug $j$. Above the base $g$ is a disk $k$ formed with a downwardly-extending lug $m$; and through the disk $k$ and the end of the bridge $i$ is screwed the screw pivot pin $n$ into the center of the base $g$ of the pivot piece. A coil-spring $o$ is interposed between the disk $k$ and the base $g$. One end of the spring rests against the lug $h$ while its other end is engaged by the lug $j$.

When the lenses $p$ are carried to the front to increase the interval between the nose-guards $c$, (as shown by full lines in Figs. 1 and 4,) the springs $o$ are each compressed between the lugs $j$ and $h$, (Fig. 4). The lug $m$ will engage the bridge $i$, in case the lens is carried too far to the front.

In the modification shown in Figs. 6 and 7, the pivot-piece $q$ is formed with two upwardly-extending lugs, while the disk $r$ has no lug. The lug $s$ of the pivot-piece $q$ engages one end of the coil-spring $o$, while its other end is engaged by the lug $j$ on the end of the bridge $i$, as above. The lug $t$ prevents the lens from being forced too far to the front, since in that case it engages with the bridge $i$.

In the modification shown in Figs. 8 and 9, the bridge $u$ is formed at each end with a loop $v$ pierced with the holes $w$, for the passage of the pivot-pin $x$, which projects upwardly from the pivot-piece $y$. The latter is formed with ears 2, 3, the first of which engages one end of the spring $o$ the other end of which is engaged by the loop-end of the bridge. The ear 3 prevents by its engagement with the bridge the carrying forward too far of the lens $p$.

I claim:

1. In eyeglasses, the combination with a lens and a stud secured thereto, of a vertically arranged pivot-piece secured in said stud and having a pivot pin projecting upwardly therefrom; a bridge pivotally mounted on said pivot-piece; and a coil spring surrounding the pivot pin and interposed between said pivot-piece and bridge.

2. In eyeglasses, the combination with a lens and a stud secured thereto, of a pivot-piece secured in said stud; a bridge pivotally mounted on said pivot-piece; a yielding device interposed between said pivot-piece and bridge; and a device for preventing the lenses being turned too far forward.

3. In eyeglasses, the combination with a lens and a stud secured thereto, of a pivot-piece secured in said stud and carrying an upwardly extending lug and a pivot pin; a bridge pivotally mounted on said pivot-piece; and a coil spring surrounding the pivot pin and having one end bearing against said bridge and the other end of which bears against said lug.

4. Eyeglasses consisting of a pair of lenses; a stud secured to each of said lenses; a pair of nose-guards; a pair of pivot-pieces; means for securing one of said nose-guards and pivot-pieces in each of said studs; a bridge to each end of which is pivotally secured one of said pivot-pieces; a spring interposed between each pivot-piece and the end of the bridge pivotally secured thereto; and a device for preventing the lenses being thrown too far forward.

5. In eyeglasses, the combination of a bridge each end of which is formed with a lug; a stud carrying device mounted free to swing on the end of said bridge; said device being formed two lugs, one of which extends upwardly and the other of which extends downwardly; and a spring, one end of which bears against the lug formed on the end of said bridge and the other end of which bears against one of the lugs formed on said device; the other lug formed on said device serving to limit the rotary movement of said device in coöperation with said bridge.

In testimony whereof I have hereunto signed my name in the presence of two witnesses at said Brockton this 26 day of December, A. D. 1906.

WALLACE L. BEMIS.

Witnesses:
  R. H. COLE,
  T. H. MERRILL.